(12) United States Patent
Mattes

(10) Patent No.: US 8,898,031 B2
(45) Date of Patent: Nov. 25, 2014

(54) METHOD FOR VISUALIZING AND QUANTIFYING THE CHANGES IN AN ORGANIC OR NON-ORGANIC STRUCTURE IN THE HUMAN BODY

(75) Inventor: Julian Mattes, Hagenberg (AT)

(73) Assignee: Mattes Medical Imaging GmbH, Hagenberg (AT)

( * ) Notice: Subject to any disclaimer, the term of this patent is extended or adjusted under 35 U.S.C. 154(b) by 111 days.

(21) Appl. No.: 13/228,189

(22) Filed: Sep. 8, 2011

(65) Prior Publication Data

US 2012/0232829 A1    Sep. 13, 2012

(30) Foreign Application Priority Data

Sep. 8, 2010 (EP) .................................... 10175775

(51) Int. Cl.
*G06T 7/00* (2006.01)
*G06T 19/20* (2011.01)

(52) U.S. Cl.
CPC ....... *G06T 19/20* (2013.01); *G06T 2207/10028* (2013.01); *G06T 2200/24* (2013.01); *G06T 2210/41* (2013.01); *G06T 2207/30101* (2013.01); *G06T 2219/2024* (2013.01); *G06T 2207/30052* (2013.01); *G06T 7/0014* (2013.01)
USPC ........................................................ 702/127

(58) Field of Classification Search
CPC .............................. A61B 19/00; G06T 7/0014
USPC ........................................................... 702/127
See application file for complete search history.

(56) References Cited

U.S. PATENT DOCUMENTS

| 8,433,398 | B2 * | 4/2013 | Zhang ............................ 600/518 |
| 2008/0319681 | A1 * | 12/2008 | Chau ................................ 702/23 |
| 2012/0093382 | A1 * | 4/2012 | Mahnken et al. ............. 382/131 |

* cited by examiner

*Primary Examiner* — Bryan Bui
(74) *Attorney, Agent, or Firm* — Nixon & Vanderhye P.C.

(57) ABSTRACT

The invention relates to a method for visualizing and/or quantifying structures, in particular structures within an object and/or subject, preferably within the human body. The method according to the invention is in particular characterized by the automatic or semiautomatic calculation of a decomposition of the structure into components as well as by at least one of the following steps: (i) the optionally sole visualization of one or more of these components, in particular in case of a superimposed representation of the structure for two or more points in time, and/or (ii) the representation of different components in different colours/shades/patterns, and/or (iii) the calculation of quantitative parameters describing the structure and/or its components, separately for the individual components, and/or (iv) the calculation of parameters measuring the interrelationship between specific components.

18 Claims, 2 Drawing Sheets

METHOD FOR VISUALIZING AND QUANTIFYING THE CHANGES IN AN ORGANIC OR NON-ORGANIC STRUCTURE IN THE HUMAN BODY

The present invention relates to a method for visualizing and/or for quantifying structures and their changes in particular by means of decomposing the respective structure, which preferably is within an object or subject, into several components and locally assigning the measured values and visual representations to these components, wherein the calculation with respect to the decomposition of these structures is performed automatically or semi-automatically.

BACKGROUND OF THE INVENTION

Modern scanning techniques permit the observation and examination of structures within the human body. Image analysis methods aid in visually supporting the observations and examinations as well as carrying out measurements.

In order to recognize, measure and evaluate the change in an organic or artificial structure in the human body, it is possible, on the one hand, to separately examine and evaluate the scans at different examination times in order to subsequently compare the assessments, whereby the changes can be recognized. On the other hand, the scanned structures can be brought into a common reference system to subsequently visualize and measure the motion of these structures that has taken place between the examination times and to derive values from the measured data which permit an evaluation of the changes.

In the case of the former approach, size parameters such as volume, length, diameter, circumference, surface etc. are in the prior art often separately measured for the examination times and subsequently compared. In the case of the latter approach, however, often motion fields are calculated from which subsequently global motion parameters can be derived, such as the average displacement or the rotation in various rotational directions which matches best the structure for the different points in time.

Alternatively also local parameters are derived, such as the site of the most considerable deformation and the assigned local motion values.

Specifically in the case of the examination of the change in aorta stent grafts, which are used for the treatment of aorta aneurysms, a method was proposed (e.g. in EP 1 914 683 A2) for calculating the motion relative to a reference structure which does not deform or deforms only slightly by means of the technique of point-set registration or greyscale-picture registration. What is meant by registration is the calculation and performance of the geometric transformation (e.g. displacements and rotations, i.e. rigid transformations or artificially generated deformations according to specific model requirements, i.e. non-rigid transformations) according to which the registered objects match each other to an extent as good as possible. In this method, the stent superimposed for two points in time is illustrated.

1. after only the reference object, e.g. the spinal canal, was registered and the stent was transformed according to the transformation of the reference object, or
2. after a further registration of the stent for both points in time on the basis of the respective position obtained after step 1, wherein the registration may be both rigid and non-rigid.

It is thus possible to quantify both the global motion of the stent graft relative to the reference object and its deformation. The latter is assessed, for example, by the average or the root mean squares of the individual displacement vectors, calculated for all generated stent surface points—or for a selection of these stent surface points. A disadvantage of this analysis is that it is not explicitly determined which deformations occur at which sites of the stent graft. However, this information may be essential, i.a., with respect to the predictive power of the measured values as to whether any complication is looming. Furthermore, the visualization of the superimposed stents is often complicated since the vision on some parts may be obscured by other parts.

It is therefore an object of the present invention to overcome the disadvantages of the prior art and to provide an improved and in particular a more accurate method for visualizing and/or quantifying structures and their changes.

The object of the present invention is solved by the independent claims and the aspects discussed hereinafter. The dependent claims describe further preferred embodiments and modifications of the invention.

Preferred Definitions And Agreements

Surface representation: What is meant by a surface representation is in particular the representation of a surface (initial surface) by means of geometric elements which can be assigned to the surface such that the surface can be re-calculated therefrom at least approximatively—this is described, i.a., in Hoppe et al., "Surface reconstruction from unorganized points" (92). Such geometric elements are, e.g., points which are distributed on the surface and the set of these points thus constitutes the surface representation. The term surface representation preferably is meant to also include the complete initial surface itself as well as substantially the greyscale region of a volumetric picture data set, including the grey value assigned to each voxel of the region, that is completely enclosed by a surface. The definition analogously applies to contours instead of surfaces, specifically in the case of two-dimensional image data sets.

Decomposition of a surface representation: What we understand by decomposition of a surface representation is the fragmentation of the surface which can be reconstructed from the representation into surface components so that essentially every surface area is assigned to exactly one component. If the initial surface is closed, it is possible that, in the event that non-closed components are formed by the above-defined decomposition, optionally additionally a decomposition of the region which was enclosed by the initial surface can be made by means of which substantially such components are supplemented to form closed surfaces. If the initial surface is not closed, it can be firstly closed by adding corresponding surface parts.

The calculation of the decomposition is referred to as automatic if it can be made without any user interaction; if user input is required at one or more points, while the calculation otherwise is made automatically, we refer to the calculation of the decomposition as semi-automatic.

Main axis and main axis portion: If a component of a surface representation is substantially axially symmetric for at least one direction, this surface representation has at least one main axis. A cylinder, for example, has an axis of symmetry, which is in its center—we refer to it as main axis. In the methods described herein, structures are decomposed into components. Preferably, tube-like structures are decomposed into a discrete number of substantially cylindrical or annular components (in the case of a discrete decomposition into annular components, it is possible to define substantially cylindrical components which have the annular components as end parts). Each cylindrical component has a main axis. What is referred to as main axis portion is the part of the main axis that has an extension that substantially corresponds to the length of the cylinder.

Medial line: We define the medial line of an exactly tubular object or its surface representation preferably as being the line through the centers of the circles that are formed in intersections of the object with (perpendicular) planes. In approximatively tubular objects, we refer to each medial line that is obtained by an approximation with an exactly tubular object of the examined object as a medial line. We define the medial line of objects composed of approximatively tubular partial objects as being the composition of the medial lines of each of the individual partial objects, wherein they are joined at the branching points (e.g. Y points) by connection lines, preferably a straight-line section or a smoothly interpolated curve part. We use the term center line synonymously with the term medial line. When the main axis portions have been (approximatively) defined for substantially all components of the object, we understand a medial line of this object also to be the composition of the main axis portions of its components, wherein the ends of the main axis portions are preferably connected by a straight-line section or a smoothly interpolated curve part. Prior to their connection, the two main axis portions to be connected can be extended along the straight lines through the respective main axis portion up to the point where they intersect or up to the points of the shortest distance between the straight lines. Thereafter, they will be connected from these points preferably again by a straight-line section or a smoothly interpolated curve part.

Medial axis or skeleton: A set or a region generally has an edge consisting of edge points. When the region corresponds to a two-dimensional image region, the edge of the region is the contour of the region. Every point in the region has at least one edge point that is closest to it. However, there are also points that do not have an unambiguous closest edge point (the central point in a square, for example, has the same distance to all central points of the sides and this distance is smaller than the distance to all other points of the sides). The set of the points which do not have an unambiguous closest edge point is referred to as medial axis or skeleton. This is described, i.a., in H. Blum: "A transformation for extracting new descriptors of shape" (1967). The medial axis is often a composition of one-dimensional lines which are not necessarily connected. In the aforementioned example of a square, these lines are the diagonals. This definition, of course, applies also to three-dimensional sets or regions. In this case, the medial axis may also be an area. We refer to the medial axis of the area that we obtain as medial axis of the image region as reduced medial axis of a three-dimensional image region. In this connection, the distances between two points of the area are calculated as the lengths of the shortest lines that connect the points within the area.

Confiner: We define a confiner for a given two- or three-dimensional greyscale image data set as a connected region of the image in which all of the greyscales of the associated voxels/pixels are greater than or equal to a predetermined greyscale level and wherein all voxels/pixels adjoining the connected region have a grey value that is strictly smaller than the predetermined level. The fact that the region is connected means that it cannot consist of partial regions which are separated from each other by pixels having a grey value that is strictly smaller than the predetermined level.

Motion vectors: When a point of an object moves from position 1 to position 2, the motion vector of the point is essentially defined as the difference of the local vectors of position 1 and position 2.

"Above" a plane: When a plane is spanned by the vectors a and b, we refer to positions which, in the direction into which the middle finger shows according to the right-hand rule of the Cartesian product (wherein a corresponds to the thumb and b to the index finger), are above the plane as "above" this plane.

Stent graft and stent: A stent graft is in particular a tubular, synthetic-fibre-coated metal grid which may be branched and can be inserted into blood vessels, preferably into the aorta. In particular, it is inserted in case of aneurysms. The metal grid alone, without the synthetic-fibre coating, is referred to as stent. In a CT scan, only the metal grid, i.e. the stent, is visible.

SUMMARY OF THE INVENTION

The method according to the invention automatically or semi-automatically calculates a decomposition of a structure into several components, wherein the condition of this structure or a change in it is to be visualized, quantified and assessed. Thus, when visualizing the structure superimposed for different points in time, it is possible that this structure is not displayed completely for both points in time but only selected components thereof. Additionally, quantitative parameters or visual objects which can be assigned to individual components of the structure can be calculated and/or visualized separately and it is also possible to calculate parameters which measure the interrelation of specific components to each other. An example of such an interrelation is the relative position of two components to each other. In order to determine it and characterize it by parameters, it is possible, for example, to calculate the distance of the centers of mass of the components or, on the assumption of a homogeneous mass distribution, the principal inertia axes can be calculated and thus angles between the directions of the principal inertia axes can be determined. The relative position as interrelation between the components is then characterized by these parameters. Instead of the individual components or additionally thereto, the method can calculate a simplified representation of these components, in particular a medial line of the structure or of its components or the medial axis or, in the case of a three-dimensional structure, the reduced medial axis of the structure or of its components. With this simplified representation of the structure, the same procedure can be followed as the one described above for the decomposition of the structure, in particular, the representation, unless already in this form, can be decomposed according to the structure into components to which quantitative parameters can be assigned individually, by pairs and/or by groups.

Preferably, the method calculates the decomposition by means of a complete and exactly precalculated surface or surface representation or by means of a precalculated approximation, for example a rough approximation, of this surface or surface representation. Preferably, a geometric model or a model surface representation of each of the components of the structure is adjusted to the precalculated surface of the entire structure—or of its rough approximation—for example, after an automatic registration of model parts with this precalculated surface. Depending on the respective possible configuration of the structure, it is also possible to take components having identical model surfaces and being present in an unknown number as a basis. In the event that a rough approximation of the surface has been precalculated, it is also possible to calculate a better approximation of the surface along with the decomposition method in that parts of the rough approximation which do not belong to the structure (e.g., to the stent) are identified and removed. Furthermore, it is possible to look for missing parts of the surface representation of the structure in the halftone image data set by means of the model components and to supplement the missing parts, if any. The method according to the invention is appropriate, for example, for an automatic or semi-automatic calculation of the decomposition of a stent graft.

The stent graft, which in particular can be depicted in a computer tomography scan, comprises a preferred decomposition, on the one hand, a main body and branches of the stent as components, or, if available, annular or cylindrical segments of the stent (see, e.g., FIG. 1) as components, on the other hand. If the stent is not composed of annular segments, the further decomposition of the branches and/or the main body is preferably to be made in adaptation to the respective other composition of the stent type.

A method for segmenting a structure, e.g., a stent, from a preferably two- or three-dimensional greyscale image data set is also defined by the aforementioned approach for improving a rough approximation of a surface representation by means of a geometric model or a model surface representation. Specifically, it is possible to calculate from the image a confiner and/or its surface which either already represents a desired surface representation of the structure or only a rough approximation thereof, from which the desired surface representation of the structure can be obtained by the aforementioned method.

In this connection, the adjustment as a basis for subsequent identification and removal of parts of the surface representation which do not belong to the structure (e.g., to the stent) can be performed, on the one hand, in that components of a respective model surface representation are fitted to the surface representation of the confiner by means of the technique of registration, wherein certain degrees of freedom are permitted, and the elements of interest of this surface representation (points/voxels/pixels/image regions) are marked and/or assessed according to their distance from the model surface representation. On the other hand, the adjustment can also be performed without any explicit model surface representation solely on the basis of implicit knowledge of the model geometry, such as, for example, the substantially radial arrangement of the surface points along an axis or medial line of the cylindrical or tubular components of a stent. This approach likewise permits the marking and/or assessment of respective elements of the surface representation of the confiner. Preferably, a combination of the two adjustment possibilities is also possible, wherein the aforementioned "implicit knowledge" could serve for the purposes of initialization.

The identification and removal of parts which do not belong to the structure, e.g. to a stent, can be performed in that, instead of the original confiner, confiners for a higher greyscale level which are contained in the original confiner are selected on account of the aforementioned marking and/or assessment; instead of several confiners, only one confiner may be used. Additionally, a confiner which is at an assumed site in the vicinity of the present parts can be determined for the search for missing parts and can be adjusted to a respective model component.

The annular or cylindrical segments of the stent can be represented by their respective main axis portions. Thereby, the individual segments can be visualized separately and the angles between the direction vectors of the main axis portions can be calculated.

As convention, it can be determined according to FIG. 4 that the angle for two adjacent segments which are straight behind each other is 0° and otherwise corresponds to the deviation from this position. Preferably, the angles can be defined such that they may assume both positive and negative values, wherein positive and negative values are "opposite". This is preferred in order to be able to better pursue changes, in particular temporal changes. If there is an order between the components, a direction can be assigned to the components and it can preferably be stipulated that a positive angle is assigned to a deviation to the right—seen from the first part and from above the plane spanned by the two parts—and a negative angle to a deviation to the left. In the case of three successive components, it is also possible to calculate the angle and the distance between the third part and the plane spanned by the other two parts. The angle can be defined to be positive when the third component is above the plane according to our definition and otherwise to be negative.

In addition to the parameters already mentioned and partly based thereon, we define the following further preferred parameter groups:

The length along the medial line starting from a fixed reference point up to a marked point on each segment assigned to a component of the decomposition of the object, e.g., up to the starting point, central point and/or end point of the segment of the respective component; in addition to the length along the medial line between the respective aforementioned points, we also consider the length of the respective direct connection. Thus, the number of the components is implicitly considered as well.

The deflection of the direction vectors of the respective main axis portions of the components with respect to a fixed reference direction which is defined inherently to the system, e.g., the direction defined by the starting and end points of the medial line of the main body of a stent, as reference direction and the deflection of all direction vectors of the main axis portions for all annular stent components. In the case of a medial line that is not piecewise straight but differentiable, we consider, instead of the direction vectors of the main axis portions, the tangential vectors at marked sites, e.g., at the starting, central and/or end points of the segment of the respective component.

The points with the locally strongest angle along the medial line for one of the aforementioned definitions of the angle; in the case of an at least piecewise continuously differentiable medial line, we consider the respective locally strongest curvature. Likewise, we consider points with a change of sign of the angles or curvatures. For one marked point on the medial line portion of a component, we consider the pair of points for which the distance between two non-adjacent components is minimal or maximal as further marked points. As an additional parameter, we consider the distance of a fixed reference point, preferably on the medial line, to the thus defined marked points, in each case directly and along the medial line. Furthermore, we consider the reference number of the component containing the respectively marked point as a parameter.

Additionally, we define preferred parameters on account of two surface representations of either the same structure at different times or of two different structures having a comparable configuration. We consider in this connection:

Changes in the angles which correspond to different representations.

The vectors which connect corresponding points on the medial lines, in particular for specifically marked points on these lines as defined above.

The direct distances, distances along the respective medial line and the connecting vectors between two corresponding marked points as defined above.

Values which can be derived from the motion vectors which can be assigned to a component, such as, e.g., the mean value or the root mean squares value of the motion vectors of the respective component.

In the above description, the parameters which have been obtained for a component can be replaced by a partial group of the components. For example, the mean value or the root mean squares value of the individual motion vectors can be calculated separately for the surfaces of the main body and branches as well as their decomposition.

All or some of these parameters can be combined into a feature vector by means of which a statistic connection can be created with phenomena of the course of the disease, such as complications arising during the course of treatment.

In particular, the method according to the invention can be exemplarily described by the following aspects.

According to aspect 1, the invention relates to a method for visualizing and/or quantifying structures and/or their surface representation, in particular structures within an object and/or subject, preferably within the human body. The method according to the invention is in particular characterized by the automatic or semiautomatic calculation of a decomposition of the structure and/or surface representation into components as well as by at least one of the following steps: (i) optionally sole visualization of one or more of these components, in particular in case of a superimposed representation of the structure for two or more points in time, (ii) representation of different components in different colours/shades/patterns, (iii) calculation of quantitative parameters which can be assigned to the components, separately for the individual components, specifically parameters, which describe the individual components themselves or their change, (iv) calculation of parameters which measure the interrelationship between specific components.

2. The method according to aspect 1, wherein each of the components is represented by a geometric object, and wherein optionally this representation of the components is preferably visualized together with the respective original components or alone. Preferably the common representation can also comprise a transparent representation of the original components. Additionally or alternatively the calculation of the quantitative parameters describing the components themselves or the interrelationship between specific components can also be assigned to the respective representation of the components.

3. The method according to aspect 2, in which the structure and/or its components are represented by one of their medial lines (or center lines) and/or by their main axis portions or by their medial axis and/or, in the case of a three-dimensional structure, by their reduced medial axis.

4. The method according to aspect 3, in which the quantitative parameters describing the interrelationship between two adjacent components are calculated as the angles between their medial lines at the points which are closest to each other.

5. The method according to any one of aspects 1 to 4, in which the method for decomposing the structure is characterized in that its exact surface or a rough approximation thereof is calculated and automatically adjusted to model surfaces for the possible components of the structure, wherein preferably the technique of registration is used in the adjustment.

6. The method according to any one of aspects 1 to 5, in which a proximity relationship between the components is determined and/or an order between the components and/or for partial groups of the components is defined, all this, as the case may be, by means of previous knowledge about the structure, comprising at least one of the following steps:
the proximity relationship and/or order between the components is graphically visually represented, preferably as a proximity graph;
the aforementioned graphical representation and/or the respective abstractly graphically represented components are linked with the possibility to interactively control the representation of the individual components as 3D objects, i.e. to render them, for example, individually visible or invisible or transparent or to display assigned visual objects or specific parameters which are assigned to the respective component;
parameters are determined for which the knowledge of the proximity relationship and/or order is used.

7. The method according to any one of the aspects 1 to 6, in which the structure is essential in view of a subject's course of the health or disease and in which at least one of the parameters is statistically interrelated with at least one of the parameters or categories describing the further state of health or course of the disease.

8. The method according to any one of the aspects 1 to 7, in which the structure is available for two examination times and in which the motion vectors are calculated in each surface point or in selected surface points of the structure.

9. The method according to aspect 8, in which as quantitative parameters values are derived from the motion vectors which can be assigned to a component or partial groups of components, e.g., the mean value or the root mean squares value of the motion vectors of a respective component.

10. A method for improving an approximation, preferably a rough approximation, of the surface representation of a structure precalculated from a two- or three-dimensional image data set by at least one of the following steps which can be also carried out several times:
adjustment, preferably by means of the technique of registration, of the aforementioned approximation to a model surface representation of the entire structure and/or its possible components and preferably based thereon substantially the removal of parts of the approximation which do not belong to the structure, wherein preferably elements of the approximation of the surface representation are marked and/or assessed by means of the adjustment, for example, on account of their distance to the model surface representation;
search for further parts of the surface representation of the structure by means of the possible components of the model surface representation in the proximities of the already calculated surface representations of the structure in the image.

11. The method according to aspect 10, in which the adjustment is carried out on account of implicit knowledge of the model geometry, for example, the substantially radial arrangement of the surface points along an axis or medial line of the cylindrical or tubular components of a stent, whereby preferably respective elements of the surface representation of the confiner are marked and/or assessed and preferably in particular also a combination of this possibility of the adjustment with the one by means of the technique of registration is to take place, wherein preferably the aforementioned "implicit knowledge" could serve for the purpose of initializing.

12. The method according to any one of the aspects 10 and 11 for segmentation and/or surface generation from a grey-scale image, in which the approximation of the surface representation of a structure from aspect 10 is calculated as a surface representation of substantially one confiner and preferably comprising at least one of the following embodiments:
if determined to be necessary, the removal of parts of this approximation is performed substantially in that, instead of the aforementioned confiner, one or more confiners, substantially confiners contained in it, are used;

if determined to be necessary, a confiner at an assumed place in the proximity of the already calculated surface representation of the structure in the image is determined for the search for missing parts and assessed by adjustment to a corresponding component of the model surface representation and taken into account according to the assessment and, if required, reworked or not.

13. The method according to any one of aspects 1 to 12, wherein the structure comprises a stent which is preferably inserted together with a graft as stent graft for the treatment of aorta aneurysms and which is decomposed preferably into a main body and branches, wherein these parts can be decomposed in particular also into their annular segments.

14. The method according to aspect 13, in which one of the medial lines defined for the stent is used, preferably a medial line whose components are the main axes of the components of the stent.

In another embodiment, it is preferred to compose the main axis portions of the respective components of the stent to form the medial line, wherein these axes are preferably straightly extended such that two adjacent axes contact each other.

Furthermore, the invention comprises a method for improving a rough approximation of the surface of a structure precalculated from a medical two- or three-dimensional image by means of an adjustment, preferably by means of the technique of registration of the surface to the model surfaces of the entire structure and/or its possible components.

It is preferred that the method is characterized in that the precalculated approximation of the surface of the structure is adjusted to the possible model surface components and thus parts of the precalculated approximation of the surface which do not belong to the structure are identified and removed.

In a further preferred embodiment, the invention comprises a method, wherein it is looked for further parts by means of the possible model surface components in the proximities of the already calculated surfaces of the structure in the medical image.

Besides, the invention also relates to a system for visualizing and/or quantifying structures, wherein the system is adapted to carry out a method according to at least one of the preceding aspects.

Finally, the invention also relates to a computer program product which can be read directly into the memory of a computer and comprises software instructions for performing the method according to one of the preceding aspects when these instructions are carried out on a computer. In particular, the invention relates to a computer program product which can be loaded directly into the internal memory of a digital computer and comprises software code portions with which the steps of the methods according to any one of aspects 1 to 11 can be carried out when the product runs on a computer.

The invention also comprises individual features in the Figures even if they are shown there in connection with other features and/or are not mentioned above or in the following. The invention also comprises embodiments with any combination of features which have been mentioned or illustrated above or in the following with respect to different embodiments/aspects.

The invention also comprises a system for carrying out the described method, which comprises in particular means which are adapted to carry out the individual method steps.

BRIEF DESCRIPTION OF THE DRAWINGS

In the following, preferred embodiments of the present invention are briefly described with reference to the Figures, in which.

DETAILED DESCRIPTION OF THE DRAWINGS

Figure 1:
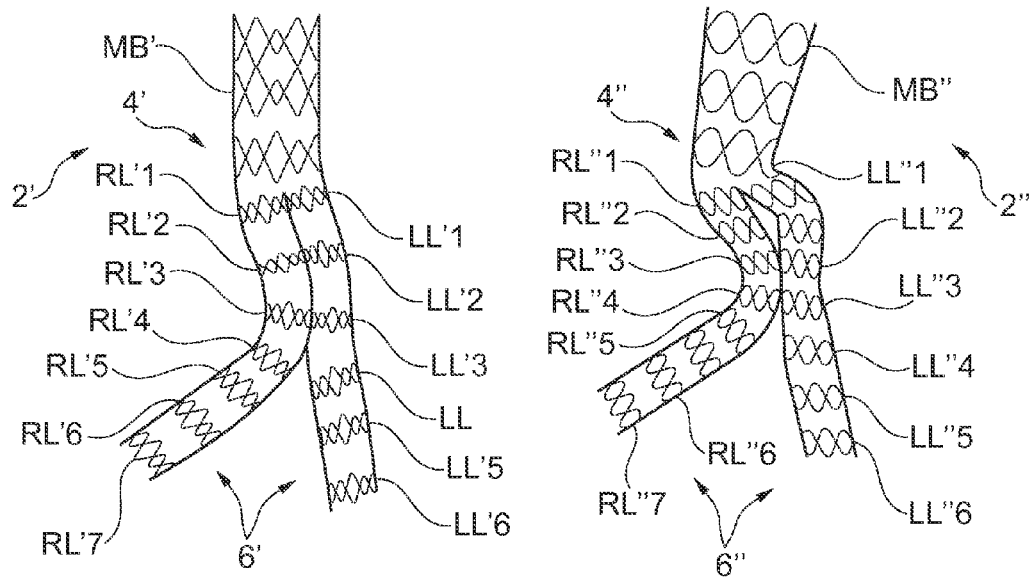
FIG. 1 shows a patient's stent for two different examination times.

In the drawings, identical or similar structures are referred to with identical reference signs.

Figure 3:
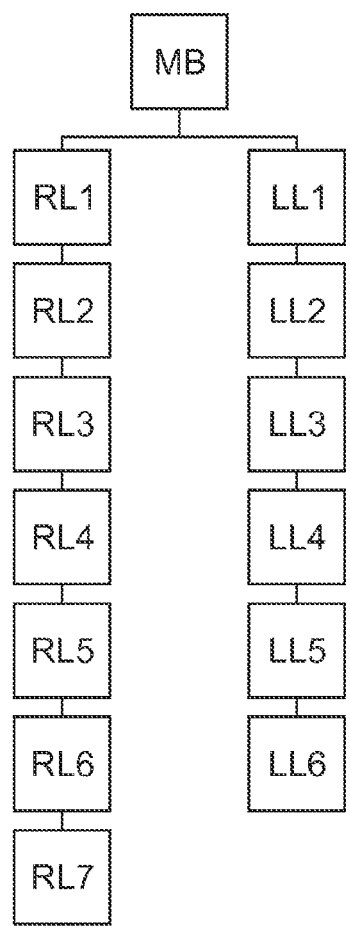
FIG. 3 shows a proximity graph for the decomposition of the stent of FIG. 1 at the first examination time.

In FIG. 1, two representations of stents (2', 2") are depicted which have been generated on account of imaging methods. These representations are representations of the same stent 2 which have been scanned in a sequence of several months, wherein the left part of the Figure depicts the first scan of the stent 2' and the right half of the Figure depicts the second, later scan of the stent 2". The stent 2 substantially comprises a main body (4', 4") and branches (6', 6"), wherein in this example two branches (6', 6") adjoin the main body (4', 4"). The branches (6', 6") of the stent have been decomposed into their annular segments, which is illustrated by the different shades. Additionally, a reference sign has been assigned to each of the components of the decomposition, which permits that the components can be ordered according to the type of the stent and, as shown in FIG. 3, represented in a proximity graph (MB denotes "main body", and RL and LL denote "right limb" and "left limb", respectively; the numbers corresponding to the second examination time have been marked with an additional apostrophe """).

In the method according to the invention, preferably the medial lines 8, 10 of the branches (6' and 6") and the medial lines 12, 14 of the main body (4', 4") are calculated. This is illustrated, for example in FIG. 2a, wherein the left side of FIG. 2a again is the first representation of a stent 2 and the right side of FIG. 2a is again the representation of the stent 2 after a certain period of time, generally some months or years. Therefore, the reference signs 8 and 12 respectively denote the medial lines of the branches and of the main body of the stent (2', 2") at a first time, whereas the reference signs 10 and 14 depict these very medial lines at a later time.

Figures 2A, 2B:
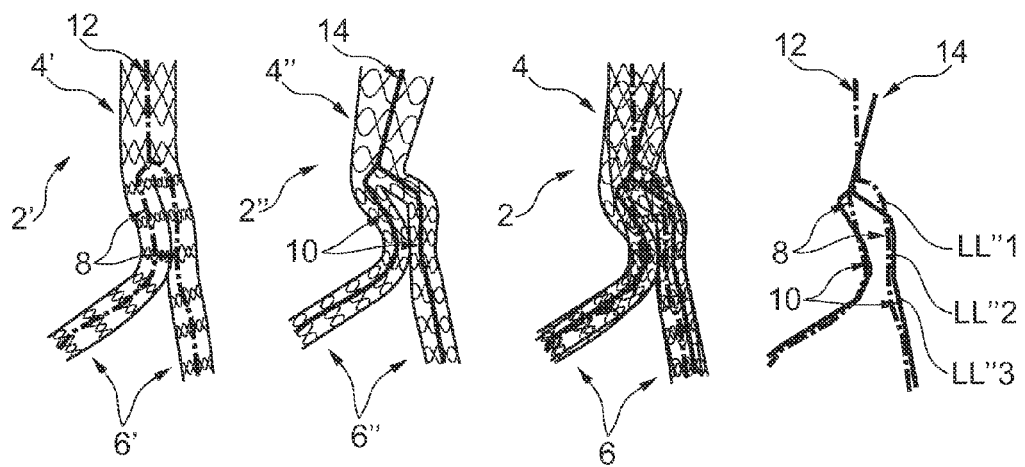
FIG. 2a shows medial lines for both points in time of FIG. 1 composed of the axes of the individual segments.
FIG. 2b shows a superimposed illustration of the stent and the medial lines according to a rigid superimposition of the stent for both examination times.

In a next step and as shown in FIG. 2b, the deferred representations of the stent 2" comprising branches 6" and main body 4" can be superimposed, as depicted on the left side of FIG. 2b. When we only consider the medial lines 8, 10, 12, 14 of the stent 2, we arrive at the right side of FIG. 2b. Again the reference signs 8 denote the medial lines of the branches of the stent 2 at a first measuring time and the reference signs 10 denote the medial lines of the branches of the stent 2 at a later time, generally some months later. Likewise, reference sign 12 denotes the medial line of the main body of the stent at a first time and reference sign 14 denotes the medial line of the main body of the stent at a later time. In this example, the period of time between these two points in time is generally several months or years. In some cases, the second examination time can be already a few days or hours after the first one in this example of application. In other fields of application (e.g., in biology), however, the examination times may also be minutes, seconds and fragments of second (i.e., preferably milliseconds and microseconds) apart. Furthermore, there are fields of application (e.g., geographic or astronomic data) in which several years, decades or centuries etc. may pass between the examination times.

As apparent from the right side of FIG. 2b, the medial lines of the branches and of the main body 10, 14 of the stent are displaced in comparison with the medial lines 8, 12 of the branches and of the main body of the stent. The state and/or the change in the state of the stent can be characterized by means of this displacement, which generally may be locally different, i.e. may comprise regions where this displacement is greater than in other regions.

In a next step, we can interrelate preferably the state and/or the change in the state of the stent with parameters or a categorization which characterize a patient's state of health and/or risk. By means of this interrelation, it is possible to define critical conditions of the stent in order to consequently preferably enable a better treatment. Although the invention has been described by means of a concrete embodiment, it is clear to the person skilled in the art that this concrete embodiment is to be considered as a non-limiting example and only serves the purpose of illustrating the invention.

FIG. 3 shows a proximity graph for the decomposition of the stent from FIG. 1 at the first examination time. When the user selects one of the number boxes (e.g. via mouse click), the respective component can be rendered visible or invisible or other operations with respect to this component can be carried out, for example, the component can be displayed transparently or the motion vectors assigned to it can be displayed.

Figure 4:
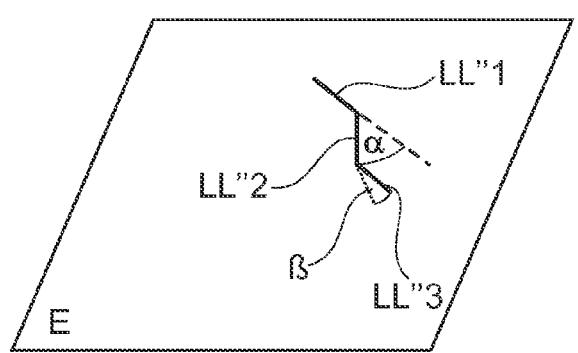
FIG. 4 shows the main axis portions for three successive components of the stent of FIG. 1 and FIG. 2 at the second examination time.

FIG. 4 shows the main axis portions for three successive components of the stent of FIGS. 1 and 2 at the second examination time. The components LL"1 and LL"2 span the plane E depicted as a parallelogram, the angle between them amounts to α and is to positive. LL"3 projects from the plane E with the likewise positive angle β and the distance from LL"3 to E is shown as 0 in this case.

The invention also comprises the precise or exact terms, features, numerical values or ranges etc. when above or in the following these terms, features, numerical values or ranges have been mentioned in connection with terms such as, e.g., "about, approximately, around, substantially, essentially, generally, at least" etc. (i.e., "about 3" is to also include "3" or "substantially radial" is to also include "radial").

The invention claimed is:

1. A method for visualizing and/or quantifying at least one structure, in particular a surface representation of said structure, by an automatic or semiautomatic calculation of a decomposition of said structure, in particular surface representation, into components as well as by at least one of the following steps:
   optionally sole visualization of one or more of said components, in particular in case of a superimposed representation of the structure for two or more points in time;
   representation of different components in different colours/shades/patterns;
   calculation of quantitative parameters which can be assigned to the components, separately for the individual components, specifically parameters, which describe the individual components or the change of said individual components and
   calculation of parameters which measure the interrelationship between specific components.

2. The method according to claim 1, wherein each of said components is represented by a geometric object, and wherein optionally
   this representation of the components is visualized together with the respective original components or alone and/or
   the calculation of the quantitative parameters describing the components themselves or the interrelationship between specific components is assigned to the respective representation of the components.

3. The method according to claim 2, in which the structure and/or its components are represented by one of their medial lines and/or by their main axis portions or by their medial axis and/or, in the case of a three-dimensional structure, by their reduced medial axis.

4. The method according to claim 3, in which the quantitative parameters describing the interrelationship between two adjacent components are calculated as the angle between their medial lines at points which are closest to each other.

5. The method according to claim 1, in which the method for decomposing the structure is characterized in that its exact surface or a rough approximation thereof is calculated and automatically adjusted to model surfaces for the possible components of the structure, wherein preferably the technique of registration is used in the adjustment.

6. The method according to claim 1, in which a proximity relationship between the components is determined and/or an order between the components and/or for partial groups of the components is defined, all this, as the case may be, using previous knowledge about the structure, comprising at least one of the following steps:
   the proximity relationship and/or order between the components is graphically visually represented, preferably as a proximity graph;
   the aforementioned graphical representation and/or the respective abstractly graphically represented components are linked with the possibility to interactively control the representation of the individual components as 3D objects, i.e. to render them, for example, individually visible or invisible or transparent or to display assigned visual objects or specific parameters which are assigned to the respective component;
   parameters are determined for which the knowledge of the proximity relationship and/or order is used.

7. The method according to claim 1, in which the structure is essential in view of a subject's course of the health or disease and in which at least one of the parameters is statistically interrelated with at least one of the parameters or categories describing the further state of health or course of the disease.

8. The method according to claim 1, in which the structure is available for two examination times and in which the motion vectors are calculated in each surface point or in selected surface points of the structure.

9. The method according to claim 8, in which as quantitative parameters values are derived from the motion vectors which can be assigned to a component or partial groups of components, e.g., the mean value or the root mean squares value of the motion vectors of a respective component.

10. The method according to claim 1, wherein the structure comprises a stent which is preferably inserted together with a graft as stent graft for the treatment of aorta aneurysms and which is decomposed preferably into a main body and branches, wherein these parts can be decomposed in particular also into their annular segments.

11. The method according to claim 10, in which one of the medial lines defined for the stent is used, preferably a medial line whose components are the main axes of the components of the stent.

12. A system for visualizing and/or quantifying structures, wherein the system is adapted to carry out a method according to at least claim 1.

13. A computer program product which can be loaded directly into the internal memory of a digital computer and comprises software code portions with which the steps of the methods according to claim 1 can be carried out when the product runs on a computer.

14. A method for improving an approximation of the surface representation of a structure precalculated from a two- or three-dimensional image data set by at least one of the following steps which can be also carried out several times:
adjustment, preferably by using a technique of registering the aforementioned approximation to a model surface representation of the entire structure and/or the possible components of said structure and preferably based thereon substantially the removal of parts of the approximation which do not belong to the structure, wherein preferably elements of the approximation of the surface representation are marked and/or assessed relying on the adjustment on account of their distance to the model surface representation;
search for further parts of the surface representation of the structure based on the possible components of the model surface representation in the proximities of the already calculated surface representations of the structure in the image.

15. The method according to claim 14, in which the adjustment is carried out on account of implicit knowledge of the model geometry, for example, the substantially radial arrangement of the surface points along an axis or medial line of the cylindrical or tubular components of a stent, whereby preferably respective elements of the surface representation of the confiner are marked and/or assessed and preferably in particular also a combination of this possibility of the adjustment with the one obtained by the technique of registration is to take place, wherein preferably the aforementioned "implicit knowledge" could serve for the purpose of initializing.

16. The method according to claim 14 for segmentation and/or surface generation from a greyscale image, in which the approximation of the surface representation of the structure is calculated as a surface representation of substantially one confiner and preferably comprising at least one of the following embodiments:
if determined to be necessary, the removal of parts of this approximation is performed substantially in that, instead of the aforementioned confiner, one or more confiners, substantially confiners contained in it, are used;
if determined to be necessary, a confiner at an assumed place in the proximity of the already calculated surface representation of the structure in the image is determined for the search for missing parts and assessed by adjustment to a corresponding component of the model surface representation and taken into account according to the assessment and, if required, reworked or not.

17. The method according to claim 14, wherein the structure comprises a stent which is preferably inserted together with a graft as stent graft for the treatment of aorta aneurysms and which is decomposed preferably into a main body and branches, wherein these parts can be decomposed in particular also into their annular segments.

18. A computer program product which can be loaded directly into the internal memory of a digital computer and comprises software code portions with which the steps of the methods according to claim 14 can be carried out when the product runs on a computer.

* * * * *